United States Patent

Elder et al.

(10) Patent No.: US 10,215,314 B2
(45) Date of Patent: *Feb. 26, 2019

(54) TUBULAR THREADED CONNECTION

(75) Inventors: Russell Elder, Houston, TX (US);
Bertrand Maillon, Houston, TX (US)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 1633 days.

This patent is subject to a terminal disclaimer.

(21) Appl. No.: 12/861,497

(22) Filed: Aug. 23, 2010

(65) Prior Publication Data

US 2012/0043756 A1  Feb. 23, 2012

(51) Int. Cl.
*F16L 15/06* (2006.01)
*F16L 15/00* (2006.01)
*E21B 17/08* (2006.01)

(52) U.S. Cl.
CPC ............ *F16L 15/002* (2013.01); *E21B 17/08* (2013.01); *F16L 15/004* (2013.01); *F16L 15/06* (2013.01)

(58) Field of Classification Search
CPC ......... E21B 17/08; F16L 15/06; F16L 15/004; F16L 15/002
USPC .......................................... 285/333, 334, 390
See application file for complete search history.

(56) References Cited

U.S. PATENT DOCUMENTS

| | | | |
|---|---|---|---|
| 4,373,754 A * | 2/1983 | Bollfrass et al. | 285/334 |
| 4,629,224 A * | 12/1986 | Landriault | 285/334 |
| 4,662,659 A | 5/1987 | Blose et al. | |
| 4,676,529 A * | 6/1987 | McDonald | 285/92 |
| 4,696,498 A * | 9/1987 | Church | 285/334 |
| 4,753,460 A | 6/1988 | Tung | |
| 4,838,068 A * | 6/1989 | Carlin et al. | 72/340 |
| 5,154,452 A * | 10/1992 | Johnson | 285/333 |
| 5,415,442 A | 5/1995 | Klementich | |
| 5,462,315 A | 10/1995 | Klementich | |
| 5,687,999 A | 11/1997 | Lancry et al. | |
| 6,347,814 B1 * | 2/2002 | Cerruti | 285/334 |

(Continued)

FOREIGN PATENT DOCUMENTS

| | | | |
|---|---|---|---|
| CA | 2361217 A1 * | 5/2002 | |
| JP | 10-89554 A | 4/1998 | |

OTHER PUBLICATIONS

U.S. Appl. No. 13/623,905, filed Sep. 21, 2012, Elder, et al.

(Continued)

*Primary Examiner* — David Bochna
*Assistant Examiner* — James A Linford
(74) *Attorney, Agent, or Firm* — Oblon, McClelland, Maier & Neustadt, L.L.P.

(57) ABSTRACT

A threaded tubular connection including a first tube and a second tube is provided. The first tube includes a pin member which extends from an end of a main body of the first tube to a terminal end of the first tube. The second tube includes a box member which extends from an end of a main body of the second tube to a terminal end of the second tube. A cross-sectional area of a pin critical cross-section is within approximately ±5% of cross-sectional area of a box critical cross-section of the box member. The cross-sectional areas of each of the pin and box critical cross-sections are within approximately ±5% of the sum of the cross-sectional areas of a box intermediate critical cross-section of the box member and a pin intermediate critical cross-section of the pin member.

20 Claims, 3 Drawing Sheets

(56) References Cited

U.S. PATENT DOCUMENTS 6,581,980 B1    6/2003  DeLange et al.
2004/0021314 A1* 2/2004 Pina et al. ...................... 285/94

OTHER PUBLICATIONS

U.S. Appl. No. 13/623,904, filed Sep. 21, 2012, Elder, et al.
Japanese Office Action dated Mar. 3, 2015, in JP Patent Application No. 2013-525262 (English translation of relevant parts).

* cited by examiner

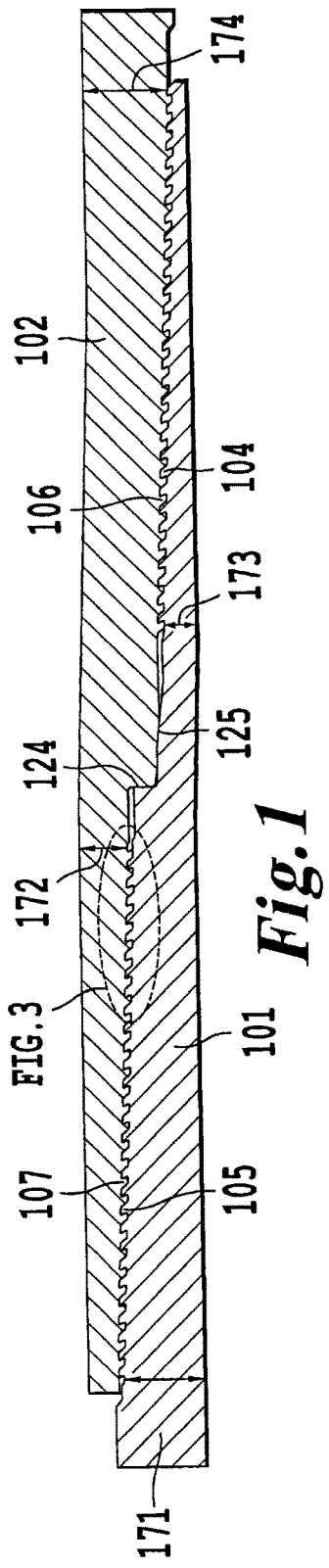
*Fig.1*
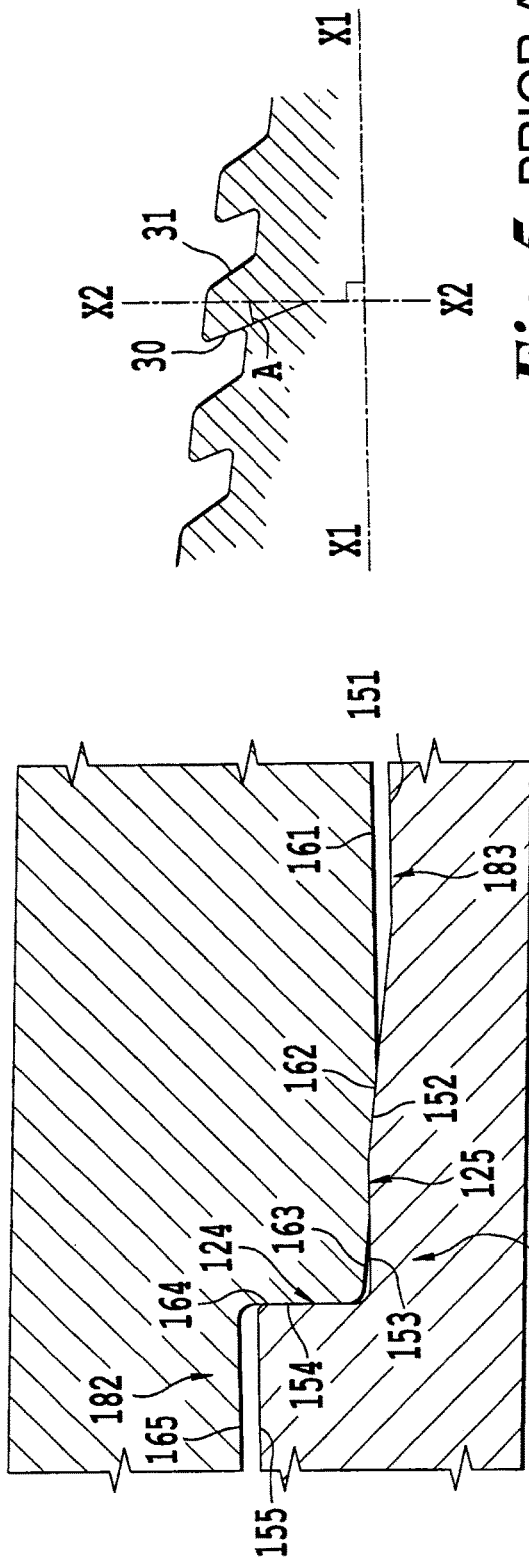
*Fig.2*
*Fig.5* PRIOR ART

TUBULAR THREADED CONNECTION

BACKGROUND

A tubular threaded connection is provided. More particularly, a tubular threaded connection with a high tensile efficiency is provided.

The present disclosure relates to joints or assemblies of tubes to be joined by threads. The tubes described herein are used in industry and, in particular, assemblies or threaded junctions used in string-lines for tubing or for lines of tubular production accessories or for a casing or a liner or a riser for the operation or prospecting or exploitation of oil or gas wells. The threaded assemblies or junctions described herein may also be used for any purpose where it may be desired to assemble pipelines or tubular accessories such as, for example, in geothermal or steam plants. The threaded assembly described herein is particularly useful in the assembly of metal tubes used for the casing of oil or gas wells or for so-called liners beyond the bottom of the casing string, as explained below.

Numerous types of assemblies are known for petroleum or gas carrying tubes that yield satisfactory results from the viewpoint of mechanical characteristics and tightness, even under tough conditions of use. Certain of these assemblies involve the use of tubes equipped with male frustoconical threads at both ends, which are assembled by couplings having two corresponding female frustoconical threads. This manner of assembly offers the advantage of rendering the two components of the assembly rigid, due to the existence of the positive interference that one can create between the male threads and the female threads.

However, the external diameter of these couplings is greater than that of the corresponding tubes and, when these assemblies are used with casing tubes, the couplings require that bore holes with increased diameter be drilled to accommodate the external diameter of the couplings. In the case of very deep wells, with a depth exceeding 4,000 meters, the initial diameter of the well first casing strings and consequently the diameter of the well in the vicinity of the surface may be twice as large using these couplings as it could be using slim couplings having an external diameter only slightly larger than the corresponding tubes of the casing strings.

To prevent this difficulty, one may use assemblies without a coupling or sleeve. In this case, the tubular elements each have one male threaded end and one female threaded end, making for a thin assembly. These assemblies or junctions are generally referred to as integral assemblies or junctions, in contrast to assemblies or junctions employing a coupling or sleeve. The same need for integral junctions is also met in the case of liners which are hung on the casing string at the bottom thereof, are not cemented to the borehole and often run horizontally to reach the oil or gas producing formation. In particular, exploitation of non-conventional gas reservoirs, such as so-called shale gas reservoirs, require such small diameter and slim liners with integral junctions.

Integral assemblies are generally made on tubes which include an expanded diameter at the end corresponding to the female threads, and a reduced diameter at the end corresponding to the male threads. This is done in order to have sufficient material in the thickness of the tubes to ensure the geometric and mechanical strength of the assembly that joins the tubes.

It is also possible to reinforce the strength of the male-female assembly by using threads in two successive sections, or steps, instead of only a single one. Each of the steps of threads has different thread diameters and is separated by a central ring-shaped abutment. This abutment makes it possible to achieve sufficient tightening of the threads while at the same time avoiding excessive on-screwing. In the case of threads with negative load flanks, the abutment makes it possible to tighten these threads on their negative flanks and this reduces risks of thread disengagement due to the action of traction stresses that may or may not be combined with strong pressures.

An abutment between steps of threads preferably has high strength in order to stop the advance of the male element into the interior of the female element at a certain point so as to prevent excessive on-screwing. In this case, the abutment acts as a center stop shoulder. One can achieve this result when the central abutment is in a zone where the two components of the assembly have a large cross-section and are made so that they are tightly connected together.

More complex center shoulder structures can be used between the steps of threads in order to allow the center shoulder to also act as a seal. However, in order to achieve good sealability, it is necessary to have an elastic tightening of the surfaces in contact because otherwise one runs the risk of being able to obtain tightness only by way of plastic deformation. In this case, the junction rapidly loses its sealability qualities in the course of successive load changes (for example, cycles of internal pressure-external pressure) or screwing and unscrewing operations. This sealability loss is essentially due to the fact that surfaces are damaged by plastic deformation and even by galling.

SUMMARY OF EXEMPLARY ASPECTS OF THE ADVANCEMENTS

In one example, a threaded tubular connection including a first tube (also referred to as a first tubular member) and a second tube (also referred to as a second tubular member) is provided. The connection can be, for example, a threaded semi-flush connection. The first tube includes a pin member (also referred to as a tubular male end) which extends from an end of a main body of the first tube to a terminal end of the first tube. The main body of the first tube can have substantially constant inside and outside diameters along an axial direction of the first tube. The pin member includes two radially offset sections (steps) of external threads. The two radially offset sections of external threads include a first thread section and a second thread section. The first thread section is separated from the second thread section by a first abutment surface, also referred to as a center shoulder. The first thread section is located between the terminal end of the first tube and the first abutment surface and the second thread section is located between the first abutment surface and the end of the main body of the first tube.

The second tube includes a box member (also referred to as a tubular female end) which extends from an end of a main body of the second tube to a terminal end of the second tube. The main body of the second tube can have substantially constant inside and outside diameters along an axial direction of the second tube. The box member includes two radially offset sections (steps) of internal threads. The two radially offset sections of internal threads include a third thread section and a fourth thread section. The third thread section is separated from the fourth thread section by a second abutment surface, also referred to as a center shoulder. The third thread section is located between the terminal end of the second tube and the second abutment surface, and the fourth thread section is located between the second abutment surface and the end of the main body of the second tube.

Each of the two steps of tapered threads includes a run-in portion on a side of a terminal end of a respective one of the first tubular member and the second tubular member and a run-out portion on the opposite side. Each run-in portion on the first tubular member engages a run-out portion on the second tubular member, and each run-in portion on the second tubular member engages a run-out portion on the first tubular member. An outside diameter of the box is no more than 10% (preferably no more than 6%) greater than a nominal outside diameter of the first and second tubular members.

The pin member has a pin critical cross-section (PCCS) located at a thread root of the second thread section that is closest to the end of the main body of the first tube. The PCCS undergoes full tension transferred across all threads of the pin. The box member has a box critical cross-section (BCCS) located at a thread root of the fourth thread section that is closest to the end of the main body of the second tube. The BCCS undergoes full tension transferred across all threads of the box. The box member has a box intermediate critical cross-section (BICCS) located at a thread root of the third thread section that is closest to the second abutment of the second tube. The BICCS undergoes tension transferred across the third thread section of the box. The pin member has a pin intermediate critical cross-section (PICCS) located at a thread root of the first thread section that is closest to the first abutment of the first tube. The PICCS undergoes tension transferred across the first thread section of the pin.

The first and second tubes satisfy the following relationships:
 PCCS is within approximately ±5% of BCCS, and
 each of PCCS and BCCS is within approximately ±5% (BICCS+PICCS).

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a cross-sectional view of a joint with the male and female tubular elements assembled together;

FIG. 2 is a detailed cross-sectional view of the stop shoulder and the separate seal portion of the joint illustrated in FIG. 1;

FIG. 5 is a partial cut-away view along axis X1-X1 of a profile a male frustoconical threading section.

DETAILED DESCRIPTION

Certain terminology used in the following description is for convenience only and is not limiting. The terms "assembly" or "joint" or "junction" are intended to have the same meaning in the following description, with the exception of when each of these terms is used in a particular context that gives a particular term further meaning. The term "pipes" is intended to encompass any type of tubes or tubular components or tubular accessories currently in existence or likely to be put to use in industry. The terms "abutment" or "abutment surface" or "shoulder" are intended to have the same meaning in the following description, with the exception of when each of these terms is used in a particular context that gives a particular term further meaning.

One solution, described in U.S. Pat. No. 5,687,999, includes locating two fluid tight metal-to-metal seal surfaces at the internal and external ends of the joint, beyond the ends of the threaded portions. The entire contents of U.S. Pat. No. 5,687,999 are incorporated herein by reference, and FIGS. 2 and 3 of U.S. Pat. No. 5,687,999 are reproduced as FIGS. 4 and 5 of the present disclosure.

Figure 4:
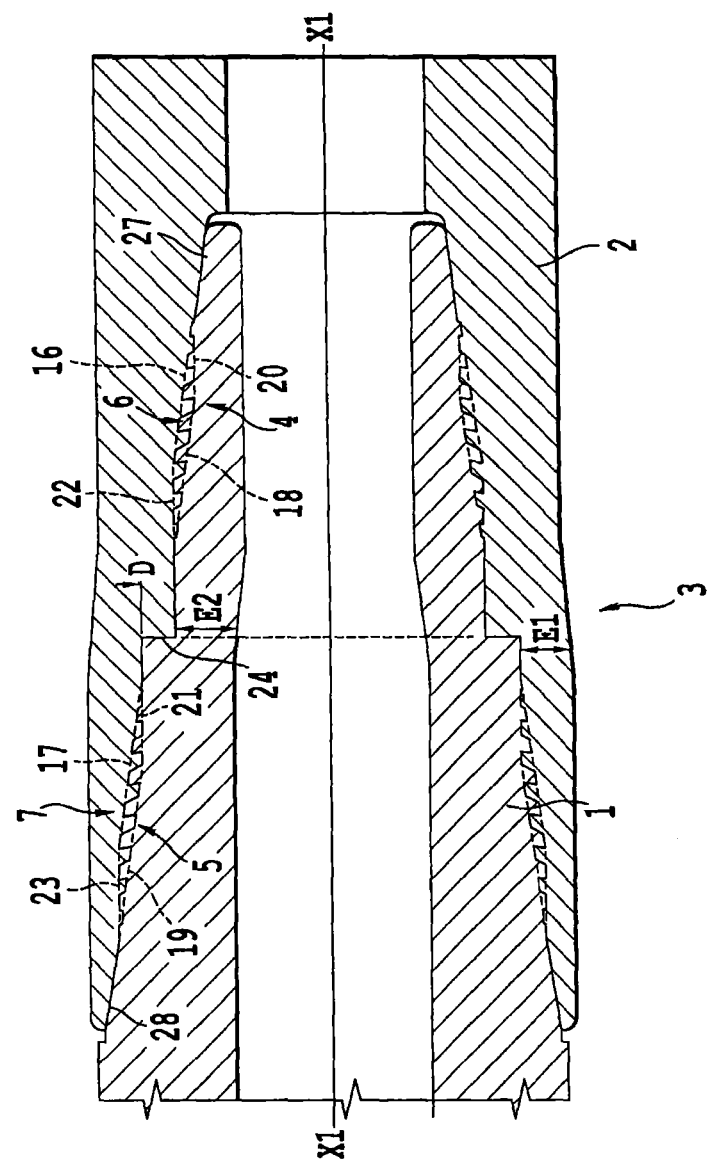
FIG. 4 is a cross-sectional view of a joint that includes a center shoulder and end seals near the terminal ends of the pin and box.

As shown in FIG. 4, in this example, each male and female element has a region with two threading sections, respectively threading sections 4, 5, for male element 1 and threading sections 6, 7 for female element 2, between which is located a ring-shaped abutment surface or shoulder 24. The mid-portions of these threading sections 4, 5 and 6, 7 are frustoconical.

The four frustoconical threading sections 4, 5 of the male element, and 6, 7 of the female element, have at each of their ends a zone of vanishing threads in which the heights of the threads diminishes to a zero value. The decrease in the height of the threads may be accomplished either by machining the crests of the threads to a constant diameter with respect to the axis of the male or female element to generate a so-called run-out thread portion, or by machining constant diameter thread roots with respect to the axis to generate a so-called run-in thread portion. By assembling the two male and female elements, their threads engage completely in the corresponding housings, both in the mid-portions of the threadings and in the end zones with the vanishing threads.

As shown in FIG. 4, in these end zones, the crests and roots of the vanishing threads are limited toward the outside or toward the inside by the convergence of a frustoconical major diameter 16, 17 or a frustoconical minor diameter 18, 19, each of which prolongs the surface of the mid-portion of the threading, and a cylindrical minor diameter 20, 21 or a cylindrical major diameter 22, 23. One can see that the difference between the diameters of these cylindrical surfaces 21 and 22 corresponds to the radial height "D" of the ring-shaped abutment or shoulder 24 in the central zone of assembly 3. This ring-shaped abutment or shoulder 24 is made up by having the two surfaces of male element 1 and female element 2 which abut against each other.

In the joint illustrated in FIG. 4, the abutment 24 does not perform any tightness or sealing function. In particular, the abutment 24 does not provide a seal under all normal operating conditions of the assembly. Instead, two fluid tight metal-to-metal seal surfaces 27, 28 are arranged at the internal and external ends of the joint, beyond the ends of the threaded portions.

As shown in FIG. 5, the load flanks of the male threads, such as 30, have a generating line with a negative inclination A of about −3° to −20°, with respect to a line extending perpendicularly to axis X1-X1 of the element. Upon screwing, the cooperation between these threads with negative load flank and abutment 24 makes it possible to tighten male element 1 and female element 2 against each other. This practically eliminates the risks of disjointing or separation at the threads.

In the connection illustrated in FIGS. 4 and 5, the shoulder (or abutment) surfaces on the male and the female elements, perpendicular to the X1-X1 axis, increase, for a given radial difference D, the mechanical strength of the joint. Consequently it is also possible to give the critical thicknesses E2 on male element 1 and E1 on the female element 2, a value as large as possible. The absence of metal/metal tightness surfaces in the central zone—surfaces whose effectiveness is, as already explained, not satisfactory according to U.S. Pat. No. 5,687,999 due to the rigidity of this zone—makes it possible to move the two frustoconical threading sections closer to each other, and thus to improve according to said patent the joining action between the two male and female elements.

However, because of the radial space occupied by the sealing surfaces 27 and 28 located at thick wall locations in the connection shown in FIG. 4, the high sealing properties of this connection do not result in a high tensile efficiency. In particular, Applicants have determined the tensile efficiency of the connection shown in FIG. 4 only achieves a 70 to 80% tensile efficiency. The tensile efficiency of a connection is the ratio of the smallest "critical section" of the threads to the pipe body cross-section and limits the performance of the connection. On the other hands, increasing the thickness of the ends of the male and female portions diminishes the size of the center shoulder area, and thus reduces the connection's resistance to compression.

Figure 3:
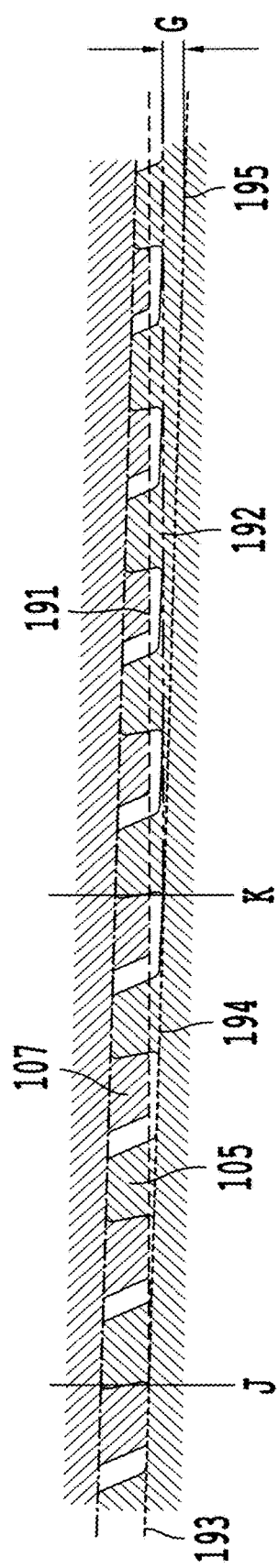
FIG. 3 is a detailed cross-sectional view of one of the thread run-in portions of the joint illustrated in FIG. 1.

FIGS. 1-3 illustrate an example connection that has a 90%, or better, tensile efficiency. As explained in greater detail below, the present example does not utilize the center shoulder as a seal. In another aspect, the present example maximizes the make-up torque of the connection and its resistance to compression by employing a large shoulder area. The present example also employs threads with negative load flanks to avoid risk of jump-out of the threads under tension in, for example, an oil well.

FIG. 1 shows a connection that includes a first tubular member and a second tubular member. The first tubular member is provided with a tubular male end 101 and the second tubular member is provided with a tubular female end 102. The tubular male end 101 of the first tubular member is referred to as the "pin," and the female end 102 of the second tubular member is referred to as the "box." The example in FIG. 1 is a threaded semi-flush connection, i.e. a connection in which the box outside diameter is only slightly larger than the pipe outside diameter, where the two members, pin 101 and box 102, are end-formed. Each of the pin 101 and the box 102 include two steps of tapered threads and a straight center shoulder 124. The pin includes a small diameter thread section 104 and a large diameter thread section 105. The box includes a small diameter thread section 106 and a large diameter thread section 107. The connection has an internal thread portion (104, 106) and an external thread portion (105, 107). In between these two portions there are a seal portion 125 and a distinct shoulder portion 124.

The configuration of the threads of the connection shown in FIG. 1 is similar to that described with reference to the example in FIGS. 4 and 5. Thus, each step of thread comprises a run-in portion on the side of the free end (terminal end) of the member and a run-out portion on the opposite side. Each run-in portion on the pin 101 engages a run-out portion on the box 102, and each run-in portion on the box 102 engages a run-out portion on the pin 101. The run-in and run-out sections may be full run-in/run-out sections, or incomplete run-in/run-out sections, i.e. in this latter case the thread height do not decrease to zero. The thread height vanishing rate may also change along the run-in/run-out section to avoid a long threaded portion. In addition, as will be discussed in further detail with reference to FIG. 3, the transition point between run-in and run-out sections of engaged threads may not be at the same location.

In order to increase the tensile efficiency of the connection illustrated in FIG. 1, in addition to a two step connection with run-in and run-out portions at the ends of each thread, this example includes a particular balance between four critical sections of the connection. These sections include a pin critical cross-section (PCCS) 171, a box intermediate critical cross-section (BICCS) 172, a pin intermediate critical cross-section (PICCS) 173, and a box critical cross-section (BCCS) 174. PCCS 171 is a cross-sectional area of the pin (also referred to as a tubular male end) 101 which undergoes full tension transferred across all threads and which is located at an end of the tubular male end 101 opposite the free end (terminal end) of the tubular male end 101. BCCS 174 is a cross-sectional area of the box (also referred to as the tubular female end) 102 which undergoes full tension transferred across all threads and which is located at an end of the tubular female end 102 opposite the terminal end of the tubular female end 102. BICCS 172 is a cross-sectional area of the tubular female end 102 which undergoes tension transferred across the external thread portion 107 of the tubular female end 102 and which is located at an end of the external thread portion 107 opposite the free end (terminal end) of the tubular female end 102. PICCS is a cross-sectional area of the tubular male end 101 which undergoes tension transferred across the internal thread portion 104 of the tubular male end 101 and which is located at an end of the internal thread portion 104 opposite the free end (terminal end) of the tubular male end 101.

If a cross-sectional area at one of these four noted critical sections of the connection are not high enough, a rupture may result at that location. PCCS and BCCS represent a risk of rupture near the end of respectively, the pin 101 and the box 102. The sum PICCS and BICCS represents the risk of rupture by tension near the center shoulder 124. The inventors of the present application have recognized that improved tensile efficiency can be achieved by satisfying the following particular relationship:

$$PCCS \sim (BICCS+PICCS) \sim BCCS$$

In the present example, the symbol "~" is intended to mean equal within ±5%.

The inventors have recognized that balancing the efficiency between the above-noted four critical sections in the manner set forth above maximizes and maintains the efficiency of the connection (~90%) while maximizing the shoulder area in order to gain more torque resistance and still ensuring the axial performance of the connection.

Further, the relationship between critical sections could involve smaller differences of 2% or even 1%. Preferably the sum of PICCS and BICCS is larger than the highest of PCCS and BCCS in to prevent rupture near the center shoulder.

As will be discussed with reference to the comparative examples set forth below, the connection illustrated in FIG. 4 does not follow the above-noted relationship between critical sections. Instead, the connection in FIG. 4 features lower connection critical section ratios (in % when compared to pipe cross section) and thus a tensile efficiency of the connection (i.e. the smallest of the connection ratios) that is smaller than for the example set forth in FIGS. 1-3.

In the connection in FIG. 4, radial space occupied by seal surfaces 27, 28 at thick ends of the male element 1 and the female element 2 reduce PCCS and BCCS. By contrast, the example in FIGS. 1-3 includes a center seal configuration which allows the thick ends of large diameter thread 105 on pin and of the small diameter thread 106 on the box to be made thicker than for the connection in FIG. 4 without major drawbacks and thus to insure the novel relationship between critical sections set forth above.

As shown in FIG. 2, the seal 125 of the present example is at a central location, beside, spaced from, and distinct from the shoulder 124. A seal surface 152 on the pin 101 provides a seal in the radial direction with a seal surface 162 on the box 102. Center shoulder surfaces 154 and 164 respectively on the box 102 and the pin 103, are located between the two steps of tapered threads, and form stop shoulders. Thus, when the connection is made-up, the shoulder surfaces 154 and 164 of the pin and box are engaged and the seal surfaces 152 and 162 of the pin and box are in tight contact due to radial interference between them. However, the shoulder surfaces 154 and 164 on pin and box are not designed to form a seal, even if they can be in tight contact when the connection is not under tension. In particular, when the pin and box are under tension typically experienced during normal operation, the shoulder surfaces 154 and 164 do not form a seal.

Choice of a sole center seal in FIG. 1 in place of two terminal seals 27, 28 in FIG. 4 allows to decrease the radial space occupied by the seals and then to increase both PCCS, BCCS and/or the shoulder area. Such choice also render the connection less sensitive to risk of jump out of pin and box due to dope pressure in case of overdoping, lubrication dope not being confined between terminal seals.

Seal surfaces 152 and 162 of seal 125 can be both conical surfaces of substantially same taper or one of surfaces 152 and 162 can be a convexly bulged surface, for example a torical surface defined by a torus radius between 10 and 100 mm, and the other surface can be conical. The taper of the conical surface may be chosen between two limits, on one side to limit radial space occupied by seal 125 and on the other side to limit a risk of galling of seal surfaces. For example a seal taper of 1/6 (16.7%) can be selected.

As shown in FIG. 2 the box and the pin surfaces are shaped to provide a radial clearance 181 between a surface 153 on the pin and the corresponding surface 163 on box. These surfaces do not and can not make a seal. Clearance 181 limits the interaction between the seal 125 and the stop shoulder 124 during external load application. Specifically, the seal portion 125 is separated from the shoulder 124 in order to limit the influence of the shoulder deformation on the seal portion 125 during tension and compression, and thus in order to maximize the performance of the connection under a cyclic load condition. The axial clearance of clearance 181 can be, for example, from 3 mm to 15 mm, and the radial clearance (radial clearance is half of the diametrical clearance which is the difference in diameter) can be, for example, from 0.125 mm to 0.4 mm.

Between the shoulder 124 and the larger thread step, there are also cylindrical surfaces 155 and 165, respectively, on the pin 101 and the box 102. There is also always a radial clearance 182 between these cylindrical surfaces 155, 165. Cylindrical surfaces 155, 165 do not and can not make a seal. Clearance 182 is a radial clearance that has a clearance of from, for example 0.1 mm to 2 mm at make-up.

A third clearance, clearance 183, is located between the seal 125 and the threads on the opposite side of the seal 125 from clearance 181. Clearance 183 is a radial clearance which is formed between cylindrical surfaces 151 and 161, respectively, on the pin 101 and the box 102. Clearance 183 has a clearance of, for example, 0.1 mm to 2 mm at make-up.

Minimizing clearances 182, 183 may increase either (PICCS+BICCS) or shoulder area but may render the connection more difficult to be made up.

As noted above, the pin and box thread run-ins are based on the cylindrical—conical connection illustrated in FIG. 4. Having a cylindrical—conical pin run-in on the external threaded section and a cylindrical—conical box run-in on the internal threaded section maximizes the shoulder area as follows: (cylindrical run-in length*thread taper)/2=increase of shoulder height due to one run-in thread portion. As there are one run-in thread portion each side of the shoulder 124 (one on the pin, the other one on the box), the total shoulder height increase will be the sum of the increases due to each run-in thread portion. FIG. 3 illustrates a detailed cross-sectional view of one of the thread run-in portions of the joint illustrated in FIG. 1. Specifically FIG. 3 illustrates a run-out portion of threads 107 of box 102, and a run-in portion of threads 105 of pin 101. Lines 193 and 194 represent are lines that follow a tapered path, whereas lines 191 and 192 represent a cylindrical diameter. Pin roots in the run-in thread portion are tapered although they lie on a cylindrical surface limited by line 192, due to shape of the machining insert.

The transition point between run-in and run-out section of engaged threads is not necessarily at the same location. In the example in FIG. 3, the transition point between box cylindrical crest and box tapered crest is identified as reference J, and the transition point between pin cylindrical root and pin tapered root is identified as reference K. The thread cylindrical length of the run-in portions can be, for example, between 3 to 4 threads pitch. With the connection in FIG. 3, an additional amount of material G can be dedicated to the shoulder height when compared with a case in which a standard run-in thread root that follows the line 195 where followed.

The thread taper can be from 1/18 (5.555%) to 1/8 (12.5%). Selecting the thread taper for each size of connection helps to:

1. ensure the efficiency of the connection PCCS~(BICCS+PICCS)~BCCS;
2. ensure a sufficient developed thread area to avoid jump-out; and
3. maximize the shoulder height, to maximize the torque capability and/or resistance to compression loads or to bending loads.

The thread taper can be different between the two stepped threads 104 (106) and 105 (107).

The length of two internal and external thread portions can be equal or different, in order to maximize the efficiency of the intermediate cross sections. The internal thread portion length can be, for example, from 100% to 50% of the external thread portion.

In addition, the total developed thread area can be greater than 130% but not larger than 250% of the lowest critical section between PCCS and BCCS.

The following tables compare the dimensions of a connection made in accordance with the connection illustrated in FIG. 4 with a connection made in accordance with the connection illustrated in FIGS. 1-3. Table 1 is an example of the dimensions for four different connections constructed using the connection illustrated in FIGS. 1-3. As noted above, this connection can achieve a tensile efficiency of 90% or more. As seen in Table 1, the critical sections could have differences that range from 3% to as low as 1%. In the tables that follow, PBCS refers to the nominal cross-sectional area of the tube body (=π*(OD−pipe wall thickness)*(pipe wall thickness)). Also to be noticed, the shoulder area is systematically larger than 25%. The outside diameter increase on the box defines a category of connection (flush/semi-flush/std) and favorably influences the global tensile efficiency of the connection and the torque shoulder area. As can be seen in Table 1, the examples are on the higher side of the possible range of an outside diameter increase for a semi-flush type of connection.

TABLE 1

Example Dimensions for Connection Shown in FIGS. 1-3.

| | OD (in.) | | | |
|---|---|---|---|---|
| | 5 | | 5.5 | |
| Weight (ft/lbs) | 21.4# | 23.2# | 23.0# | 26.0# |
| Pipe wall thickness (mm) | 11.10 | 12.14 | 10.54 | 12.09 |
| PBCS (mm$^2$) | 4042 | 4381 | 4277 | 4847 |
| Box OD (mm) | 133.4 | 134.02 | 145.3 | 145.3 |
| Box OD/pipe OD (%) | 105.0% | 105.5% | 104.0% | 104.0% |
| PCCS (%) | 91% | 91% | 91% | 91% |
| BICCS (%) | 61% | 62% | 58% | 57% |
| PICCS (%) | 32% | 32% | 33% | 34% |
| BCCS (%) | 91% | 92% | 91% | 91% |
| (BICCS + PICCS) (%) | 93% | 94% | 92% | 92% |
| | (+2%) | (+2%) | (+1%) | (+1%) |
| Shoulder area (%) | 30.9% | 31.2% | 28.6% | 26.2% |

Table 2 is an example of the dimensions for four different connections constructed using the connection illustrated in FIG. 4. As noted above, this connection only achieves a tensile efficiency of 70-80% or more. As seen in Table 2, the critical sections could have differences that are as high as 9% and 10%. Also this connection achieves a shoulder area between 20 and 25%, smaller than for the connection of FIGS. 1-3.

TABLE 2

Comparative Dimensions for Connection Shown in FIG. 4.

| | OD (in.) | | | |
|---|---|---|---|---|
| | 5 | | 5.5 | |
| Weight (ft/lbs) | 21.4# | 23.2# | 23.0# | 26.0# |
| Pipe wall thickness (mm) | 11.10 | 12.14 | 10.54 | 12.09 |
| PBCS (mm$^2$) | 4042 | 4381 | 4277 | 4847 |
| Box OD (mm) | 131.01 | 131.82 | 143.14 | 144.22 |
| Box OD/pipe OD (%) | 103.2% | 103.8% | 102.5% | 103.2% |
| PCCS (%) | 78% | 78% | 76% | 78% |
| BICCS (%) | 42% | 42% | 41% | 43% |
| PICCS (%) | 44% | 43% | 44% | 44% |
| BCCS (%) | 77% | 77% | 75% | 78% |
| (BICCS + PICCS) (%) | 87% | 86% | 85% | 87% |
| | (+10%) | (+9%) | (+10%) | (+9%) |
| Shoulder area (%) | 24.1% | 24.8% | 22.7% | 25.4% |

Obviously, numerous modifications and variations of the present invention are possible in light of the above teachings. It is therefore to be understood that within the scope of the appended claims, the invention may be practiced otherwise than as specifically described herein.

In particular other kinds of shoulder than the straight shoulder 124 of FIG. 1 can be used, for example a reverse shoulder having a negative angle of 20° or less with respect to a perpendicular to the connection axis can be used.

Also hook threads of FIG. 5 can be replaced by other thread profiles.

Dry lubrication can also be used in place of standard compound dope (RP API 5A3) to implement small radial clearances 182, 183.

We claim:

1. A threaded tubular connection, comprising:
a first tube, the first tube including a pin member extending from an end of a main body of the first tube to a terminal end of the first tube, the pin member including two radially offset sections of external threads, the two radially offset sections of external threads including a first thread section, a first non-threaded portion, a second non-threaded portion that is radially offset from the first non-threaded portion, and a second thread section, the first and second non-threaded portions being separate and distinct from the first and second thread sections, the first non-threaded portion being separated from the second non-threaded portion by a first abutment surface, the first thread section being located between the terminal end of the first tube and the first non-threaded portion and the second thread section being located between the second non-threaded portion and the end of the main body of the first tube; and
a second tube, the second tube including a box member extending from an end of a main body of the second tube to a terminal end of the second tube, the box member including two radially offset sections of internal threads, the two radially offset sections of internal threads including a third thread section, a third non-threaded portion, a fourth non-threaded portion that is radially offset from the third non-threaded portion, and a fourth thread section, the third and fourth non-threaded portions being separate and distinct from the third and fourth thread sections, the third non-threaded portion being separated from the fourth non-threaded portion by a second abutment surface, the third thread section being located between the terminal end of the second tube and the third non-threaded portion and the fourth thread section being located between the fourth non-threaded portion and the end of the main body of the second tube,
wherein the pin member includes a pin critical cross-section PCCS located at a thread engaged root of the second thread section that is closest to the end of the main body of the first tube, the box member includes a box critical cross-section BCCS located at a thread engaged root of the fourth thread section that is closest to the end of the main body of the second tube, the box member includes a box intermediate critical cross-section BICCS located at a thread engaged root of the third thread section that is closest to the second abutment of the second tube, and the pin member includes a pin intermediate critical cross-section PICCS located at a thread engaged root of the first thread section that is closest to the first abutment of the first tube,
wherein the pin includes a first central seal surface located entirely on the first non-threaded portion between the first thread section and the first abutment surface and the box includes a second central seal surface located entirely on the fourth non-threaded portion between the fourth thread section and the second abutment surface,
wherein, in a made-up state, the first central seal surface engages the second central seal surface in a radial direction so as to form a fluid tight seal that extends in an axial direction of the threaded tubular connection and is separate and distinct from the first and second abutment surfaces, and, in the made-up state, the threaded tubular connection includes first and second radial clearance portions that are axially located on opposite sides of the fluid tight seal to isolate the fluid tight seal from the first through fourth thread sections of the tubular connection, wherein the first and second radial clearance portions are radial clearances between facing surfaces of the first non-threaded portion and the fourth non-threaded portion and are separate and distinct from the first through fourth thread sections,
wherein the first and second tubes satisfy the following relationships:
PCCS is within approximately ±5% of BCCS, and
each of PCCS and BCCS is within approximately ±5% (BICCS+PICCS), and
wherein, in the made-up state, the fluid tight seal formed between the first and second central seal surfaces is the sole fluid tight seal of the threaded tubular connection.

2. The threaded tubular connection of claim 1, wherein, in the made-up state, the fluid tight seal is separated from the first and second abutment surfaces in the axial direction of the threaded tubular connection by the first clearance portion, the pin and the box being spaced apart from each other in the radial direction at the first clearance portion such that a first clearance is formed between the pin and the box at the first clearance portion.

3. The threaded tubular connection of claim 2, wherein the first clearance includes an axial clearance of from 3 mm to 15 mm, and a radial clearance from 0.125 mm to 0.4 mm.

4. The threaded tubular connection of claim 1,
wherein, in the made-up state, the threaded tubular connection includes a third clearance portion, the third clearance portion being located between the second abutment surface and the third thread section on the box and between the first abutment surface and the second thread section on the pin, the pin and the box being spaced apart from each other in the radial direction at the third clearance portion such that a third clearance is formed between the pin and the box at the third clearance portion.

5. The threaded tubular connection of claim 1, wherein the first, second, third and fourth thread sections each include threads having load flanks with a negative slope.

6. The threaded tubular connection of claim 1, wherein the first, second, third and fourth thread sections are each frustoconical and each include a run-in thread portion on a first end, a run-out thread portion on a second end, and a full height thread portion between the run-in thread portion and the run-out thread portion.

7. The threaded tubular connection of claim 6, wherein a taper of each of the first, second, third and fourth thread sections is within a range of from 1/18 to 1/8.

8. The threaded tubular connection of claim 6, wherein the run-out thread portion of at least one of the first, second, third and fourth thread sections is a partial run-out thread.

9. The threaded tubular connection of claim 6, wherein a length of the first and fourth thread sections is equal to a length of the second and third thread sections.

10. The threaded tubular connection of claim 6, wherein a length of the first and fourth thread sections is with a range of 50% to 100%/o of a length of the second and third thread sections.

11. The threaded tubular connection of claim 6, wherein a taper of the first thread section is different of the taper of the second thread section.

12. The threaded tubular connection of claim 6, wherein the run-in thread portion of at least one of the first, second, third and fourth thread sections is a partial run-in thread.

13. The threaded tubular connection of claim 1, wherein each of PCCS and BCCS is within approximately ±3% (BICCS+PICCS).

14. The threaded tubular connection of claim 1, wherein each of PCCS and BCCS is within approximately ±2% (BICCS+PICCS).

15. The threaded tubular connection of claim 1, wherein a tensile efficiency of the threaded tubular connection is at least 90%.

16. A threaded semi-flush connection, comprising:
a first tubular member, the first tubular member including a tubular male end; and
a second tubular member, the second tubular member including a tubular female end, each of the tubular male end and the tubular female end including two steps of tapered threads and a straight center shoulder, the two steps of tapered threads each including an internal thread portion and an external thread portion, a seal portion and a distinct shoulder portion being located in between the internal thread portion and the external thread portion, the two steps of tapered threads including a run-in portion on a side of a terminal end of a respective one of the first tubular member and the second tubular member and a run-out portion on the opposite side, each run-in portion on the first tubular member engaging a run-out portion on the second tubular member, and each run-in portion on the second tubular member engaging a run-out portion on the first tubular member, an outside diameter of the tubular female end being no more than 10% greater than a nominal outside diameter of the first and second tubular members,
wherein, in a made-up state, the seal portions of the tubular male end and the tubular female end engage in a radial direction so as to form a fluid tight seal that extends in an axial direction of the threaded semi-flush connection, and, in the made-up state, the threaded semi-flush connection includes first and second radial clearance portions that are axially located on opposite sides of the fluid tight seal to isolate the fluid tight seal from the internal and external threaded sections,
wherein the first and second radial clearance portions are radial clearances between facing surfaces of non-threaded portions of the tubular male end and the tubular female end that are separate and distinct from the internal and external threaded sections of the tubular male end and the tubular female end,
wherein the tubular male end includes a cross-sectional area PCCS configured to transfer tension across all threads of the tubular male end and which is located at an end of the tubular male end opposite the terminal end of the tubular male end, the tubular female end includes a cross-sectional area BCCS configured to transfer tension across all threads of the tubular female end and which is located at an end of the tubular female end opposite the terminal end of the tubular female end, the tubular female end includes a cross-sectional area BICCS configured to transfer tension across the external thread portion of the tubular female end and which is located at an end of the external thread portion opposite the terminal end of the tubular female end, and the tubular male end includes a cross-sectional area PICCS configured to transfer tension across the internal thread portion of the tubular male end and which is located at an end of the internal thread portion opposite the terminal end of the tubular male end,
wherein the first and second tubular members satisfy the following relationships:
PCCS is within approximately ±5% of BCCS, and
each of PCCS and BCCS is within approximately ±5% (BICCS+PICCS), and
wherein, in the made-up state, the fluid tight seal formed between the seal portions of the tubular male end and the tubular female end is the sole fluid tight seal of the threaded semi-flush connection.

17. The threaded semi-flush connection of claim 16 wherein each of PCCS and BCCS is within approximately ±3% (BICCS+PICCS).

18. The threaded semi-flush connection of claim 16, wherein each of PCCS and BCCS is within approximately ±2% (BICCS+PICCS).

19. The threaded semi-flush connection of claim 16, wherein a tensile efficiency of the semi-flush connection is at least 90%.

20. The threaded semi-flush connection of claim 16, wherein the outside diameter of the tubular female end being no more than 6% greater than the nominal outside diameter of the first and second tubular members.

\* \* \* \* \*